US011334609B2

(12) United States Patent
Okura et al.

(10) Patent No.: US 11,334,609 B2
(45) Date of Patent: May 17, 2022

(54) SEMANTIC STRUCTURE SEARCH DEVICE AND SEMANTIC STRUCTURE SEARCH METHOD

(71) Applicant: FUJITSU LIMITED, Kawasaki (JP)

(72) Inventors: Seiji Okura, Meguro (JP); Masahiro Kataoka, Kamakura (JP); Masao Ideuchi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 16/785,656

(22) Filed: Feb. 10, 2020

(65) Prior Publication Data

US 2020/0233887 A1 Jul. 23, 2020

Related U.S. Application Data

(62) Division of application No. 14/995,775, filed on Jan. 14, 2016, now abandoned.

(30) Foreign Application Priority Data

Jan. 20, 2015 (JP) .................................. 2015-008936

(51) Int. Cl.
*G06F 16/00* (2019.01)
*G06F 16/33* (2019.01)
*G06F 16/31* (2019.01)

(52) U.S. Cl.
CPC .......... *G06F 16/3344* (2019.01); *G06F 16/31* (2019.01)

(58) Field of Classification Search
CPC .............................. G06F 16/31; G06F 16/3344
See application file for complete search history.

(56) References Cited

U.S. PATENT DOCUMENTS 6,161,084 A * 12/2000 Messerly .............. G06F 40/284
  704/9
6,289,353 B1    9/2001 Hazlehurst et al.
(Continued)

FOREIGN PATENT DOCUMENTS

JP    11-085790 A    7/1989
JP    11-085790 A    3/1999
(Continued)

OTHER PUBLICATIONS

U.S. Office Action dated Aug. 21, 2019 in prior U.S. Appl. No. 14/995,775, 21 pages.

*Primary Examiner* — Ajith Jacob
(74) *Attorney, Agent, or Firm* — Xsensus LLP

(57) ABSTRACT

A non-transitory computer-readable recording medium stores a semantic structure search program. The semantic structure search program causes a computer to execute the following process. The computer generates a plurality of search semantic symbols from a search request. Next, the computer specifies a position of a specific word that corresponds to the search request in a search target document, by the plurality of search semantic symbols and document semantic structure position information. The document semantic structure position information includes a relationship information between a plurality of semantic symbols and a plurality of positions of a plurality of words in the search target document. The plurality of semantic symbols represent a semantic structure corresponding to the plurality of words. Thereafter, the computer outputs a search result including the specific word and the position of the specific word in the search target document.

13 Claims, 21 Drawing Sheets

(56) References Cited

U.S. PATENT DOCUMENTS

| | | |
|---|---|---|
| 2005/0131886 A1 | 6/2005 | Ejerhed et al. |
| 2009/0063473 A1 | 3/2009 | Van et al. |
| 2010/0085222 A1 | 4/2010 | Kataoka et al. |
| 2011/0093479 A1* | 4/2011 | Fuchs ................ G06Q 30/0241 |
| | | 707/E17.061 |
| 2012/0204104 A1 | 8/2012 | Walsh et al. |
| 2013/0086086 A1* | 4/2013 | Kataoka .................. G06F 16/22 |
| | | 707/750 |
| 2013/0332433 A1 | 12/2013 | Kataoka |
| 2014/0114649 A1 | 4/2014 | Zuev et al. |

FOREIGN PATENT DOCUMENTS

| | | |
|---|---|---|
| JP | 2008-176489 A | 7/2008 |
| JP | 2010-093414 A | 4/2010 |
| JP | 2010-267247 A | 11/2010 |
| JP | 2013-186766 A | 9/2013 |
| WO | 2011/148511 A1 | 12/2011 |
| WO | 2012/111078 A1 | 8/2012 |

* cited by examiner

```
#FILE=./0A56/TY/0028371235.txt
:SENT=2
:SENT=3
:SENT=4
#GENBUN=KAKUSYU NO GYOUMUSOFUTO O RENTARUSABISU SURU UNYOUJIGYOUSYA NO DATASENTA TO INTANETTO O KAISITE SETUZOKUSI, ...DEKITA.
(CONNECTED TO DATA CENTER OF BUSINESS OPERATOR THAT PROVIDES RENTAL SERVICE OF VARIOUS TYPES OF BUSINESS SOFTWARE VIA INTERNET
AND SUCCEEDED IN ..........)
%GENBU1=KAKUSYU NO GYOUMUSOFUTO O RENTARUSABISU SURU UNYOUJIGYOUSYA NO DATASENTA TO INTANETTO O KAISITE SETUZOKUSI, ...DEKITA.
%GENBU2=KAKUSYU NO GYOUMUSOFUTO O RENTARUSABISU SURU UNYOUJIGYOUSYA NO DATASENTA TO INTANETTO O KAISITE SETUZOKUSI, ...DEKITA.

KAKUSYU NO        521
  GYOUMU        522        7502  4   0   6    VARIOUS=:KAKUSHU:DET:1W)
  SOFUTO                   7502  4   6   4    BUSINESS=:GYOUMU:N:1W)
  O                        7502  4  10   6    SOFTWARE=:SOFUTO:N:1W)     527
                           7502  4  16   2    /[0] JO/:DW)
                           523  524  525  526  DO.SURU, +<:POSSIBLE>::V1:1W)
  DEKI                     7502  4  206  4   /(TA) DW, +<:J.TA>:/:DW)
  TA                       7502  4  210  2       PERIOD::
                           7502  4  212  2

%GENBUN=KAKUSYU NO GYOUMUSOFUTO O RENTARUSABISU SURU UNYOUJIGYOUSYA NO DATASENTA TO INTERNETTO O KISITE SETUZOKUSI. ... DEKITA.
*INTERNET=7—<CONCERN>—>ENTREPRENEUR 7502  4   GYOUSYA NO DATASENTA TO INTANETTO  42  78  64  78  42  48
*INTERNET=7—<ENUM>—>CENTER           7502  4   SENTA TO INTANETTO              56  78  64  78  56  62
*INTERNET=7—<JITE>—>NIL               7502  4   INTANETTO                      64  78  64  78   0   0
                           532        533  534                                535 536 537 538 539 540

WORK—<M.ER>—>NIL           7502  4   SAGYOU                                   138 142 138 142   0   0
WORK—<PRED>—>NIL           7502  4   SAGYOU                                   138 142 138 142   0   0
:SENT=5
#FILE=./0A56/...
```

FIG. 5

| DICTIONARY ID | ENTRY |
|---|---|
| 0 | WA+POSTPOSITION++ |
| 1 | GA+POSTPOSITION++ |
| 2 | O+POSTPOSITION++ |
| ⋮ | ⋮ |
| 5023 | HONYAKU+NOUN+ABSTRACT THING+TRANSLATION |
| ⋮ | ⋮ |
| 7025 | SAGYOU+INFLECTED FORM OF NOUN+ACTION+WORK |
| ⋮ | |
| 8653 | HONNYAKUSHA+NOUN+HUMAN BEING+TRANSLATOR |
| ⋮ | |

F I G. 6

| DICTIONARY ID | ENTRY | |
|---|---|---|
| 0 | WA+POSTPOSITION | |
| 1 | GA+POSTPOSITION | |
| 2 | O+POSTPOSITION | |
| ⋮ | ⋮ | |
| 5023 | HONYAKU+NOUN+ABSTRACT THING | → TRANSLATION |
| ⋮ | ⋮ | |
| 7025 | SAGYOU+ INFLECTED FORM OF NOUN+ACTION | → WORK |
| ⋮ | ⋮ | |
| 8653 | HONNYAKUSHA+NOUN+HUMAN BEING | → TRANSLATOR |
| ⋮ | | |

| map.idx | | | | | | | | | | | | | |
|---|---|---|---|---|---|---|---|---|---|---|---|---|---|
| OFFSET | 0 | 1 | 2 | 3 | 4 | 5 | 6 | 7 | 8 | 9 | 10 | ... | 24 |
| CONTENT | 0 | 3 | 5 | 11 | 22 | 152 | 255 | 397 | 511 | 549 | 607 | ... | 1690 |

| map.dic | | | | | | | | | | | | | | | | | | | | | | | |
|---|---|---|---|---|---|---|---|---|---|---|---|---|---|---|---|---|---|---|---|---|---|---|---|
| OFFSET | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| CONTENT | 5023 | 7025 | 8653 | 7025 | 8653 | 2 | 14 | 34 | 35 | 88 | 986 | 15 | 103 | 432 | 971 | 1088 | 7984 | 12985 | 55931 | 88841 | 137865 | 199487 | 200291 |

| | ... | 1690 | 1691 | 1692 | 1693 | 1694 | 1695 | 1696 | 1697 | 1698 | 1699 | 1700 | 1701 | 1702 | 1703 | 1704 | 1705 |
|---|---|---|---|---|---|---|---|---|---|---|---|---|---|---|---|---|---|
| | ... | 1948 | 2183 | 4939 | 10221 | 10223 | 20393 | 50392 | 69928 | 00928 | 78944 | 200132 | 200139 | 200291 |

| | ... | 82 | 109 | 827 | ... | ... | 78 |
|---|---|---|---|---|---|---|---|

| DOCUMENT ID | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... | 92 | ... | 522 | ... | 9283 | ... |
|---|---|---|---|---|---|---|---|---|---|---|---|---|---|---|---|---|---|---|---|---|---|---|---|---|---|---|---|---|---|---|---|---|---|---|
| ENTRY | DICTIONARY ID | | | | | | | | | | | | | | | | | | | | | | | | | | | | | | | | | |
| AGE+VERB+GIVE | 1088 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 1 | 0 | 0 | 1 | ... | 0 | ... | 0 | ... | 0 | ... |
| ... | | | | | | | | | | | | | | | | | | | | | | | | | | | | | | | | | | |
| ATAE+VERB+GIVE | 2183 | 1 | 0 | 1 | 0 | 0 | 1 | 1 | 0 | 1 | 0 | 1 | 1 | 1 | 0 | 0 | 0 | 0 | 1 | 0 | 0 | 1 | 1 | 0 | 1 | 1 | 1 | ... | 0 | ... | 1 | ... | 0 | ... |
| ... | | | | | | | | | | | | | | | | | | | | | | | | | | | | | | | | | | |
| ZOUYO+INFLECTED FORM OF NOUN+GIVE | 4021 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | ... | 0 | ... | 0 | ... | 1 | ... |
| ... | | | | | | | | | | | | | | | | | | | | | | | | | | | | | | | | | | |
| KIFU+INFLECTED FORM OF NOUN+GIVE | 5911 | 1 | 0 | 0 | 0 | 0 | 1 | 0 | 0 | 1 | 0 | 0 | 1 | 0 | 0 | 0 | 0 | 0 | 1 | 0 | 1 | 0 | 0 | 0 | 0 | 0 | 0 | ... | 0 | ... | 0 | ... | 0 | ... |
| ... | | | | | | | | | | | | | | | | | | | | | | | | | | | | | | | | | | |
| TEWATASHI+VERB+GIVE | 9827 | 0 | 1 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | ... | 1 | ... | 0 | ... | 0 | ... |
| ... | | | | | | | | | | | | | | | | | | | | | | | | | | | | | | | | | | |
| HANAKO+NOUN+HANAKO | 200291 | 0 | 0 | 1 | 1 | 0 | 1 | 0 | 0 | 0 | 0 | 0 | 0 | 0 | 1 | 0 | 0 | 0 | 1 | 0 | 0 | 1 | 0 | 0 | 0 | 0 | 0 | ... | 1 | ... | 1 | ... | 1 | ... |

FIG. 10

| FIRST BYTE | | | | | | | | SECOND BYTE | THIRD BYTE | FOURTH BYTE | FIFTH BYTE | SIXTH BYTE |
|---|---|---|---|---|---|---|---|---|---|---|---|---|
| 0 | 1 | 2 | 3 | 4 | 5 | 6 | 7 | INTRA-DOCUMENT SEMANTIC SYMBOL ID OF NODE 1 | | INTRA-DOCUMENT SEMANTIC SYMBOL ID OF NODE 2 | | ARC TYPE |
| TYPE OF PATTERN | | ORDER OF NODE 1 | | | ORDER OF NODE 2 | | | | | | | |

F I G. 11A

| FIRST BYTE | | | | | | | | SECOND BYTE | THIRD BYTE | FOURTH BYTE |
|---|---|---|---|---|---|---|---|---|---|---|
| 0 | 1 | 2 | 3 | 4 | 5 | 6 | 7 | INTRA-DOCUMENT SEMANTIC SYMBOL ID OF NODE 1 | | ARC TYPE |
| TYPE OF PATTERN | | ORDER OF NODE 1 | | | | | | | | |

F I G. 11B

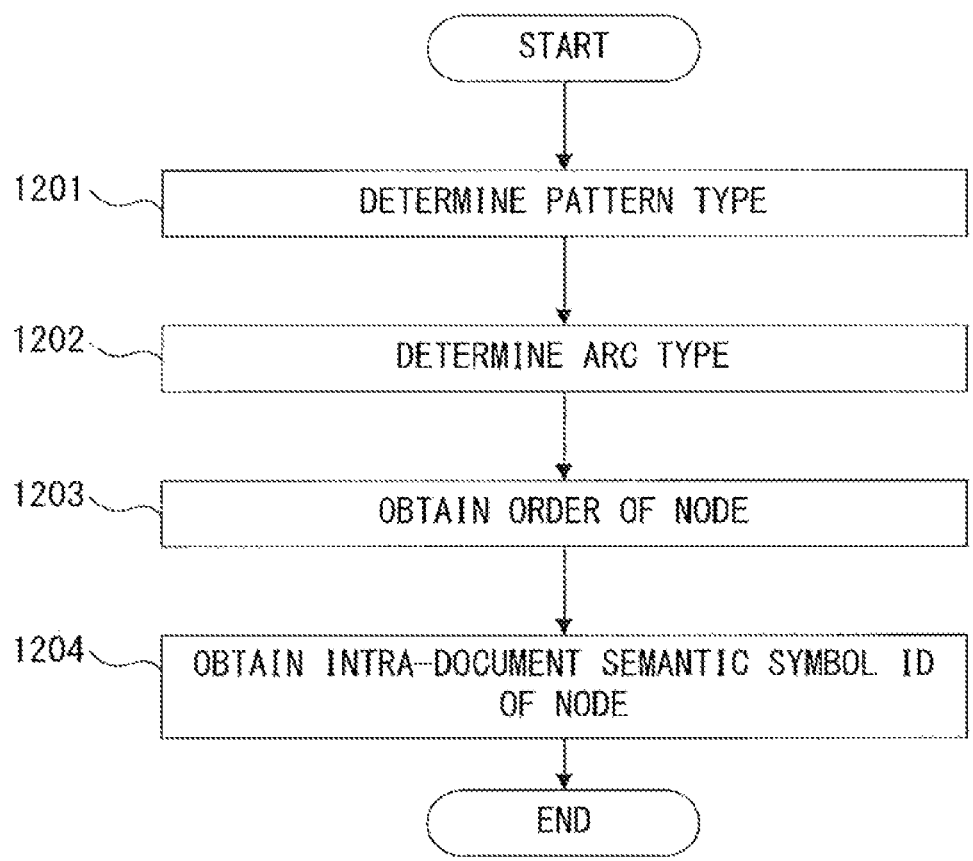
F I G. 12

| | FIRST BYTE | | | | | | | SECOND BYTE | THIRD BYTE | FOURTH BYTE | FIFTH BYTE | SIXTH BYTE |
|---|---|---|---|---|---|---|---|---|---|---|---|---|
| 1301 | 0 | 1 | 2 | 3 | 4 | 5 | 6 | 7 | 2 | | 29 | 21 |
| | 0 | | | 5 | | | 8 | | | | | |

| | FIRST BYTE | | | | | | | SECOND BYTE | THIRD BYTE | FOURTH BYTE | FIFTH BYTE | SIXTH BYTE |
|---|---|---|---|---|---|---|---|---|---|---|---|---|
| 1302 | 0 | 1 | 2 | 3 | 4 | 5 | 6 | 7 | 4 | | 6 | 52 |
| | 0 | | | 1 | | | 6 | | | | | |

| | FIRST BYTE | | | | | | | SECOND BYTE | THIRD BYTE | FOURTH BYTE | FIFTH BYTE | SIXTH BYTE |
|---|---|---|---|---|---|---|---|---|---|---|---|---|
| 1303 | 0 | 1 | 2 | 3 | 4 | 5 | 6 | 7 | 4 | | 11 | 66 |
| | 0 | | | 3 | | | 1 | | | | | |

...

F I G. 1 3

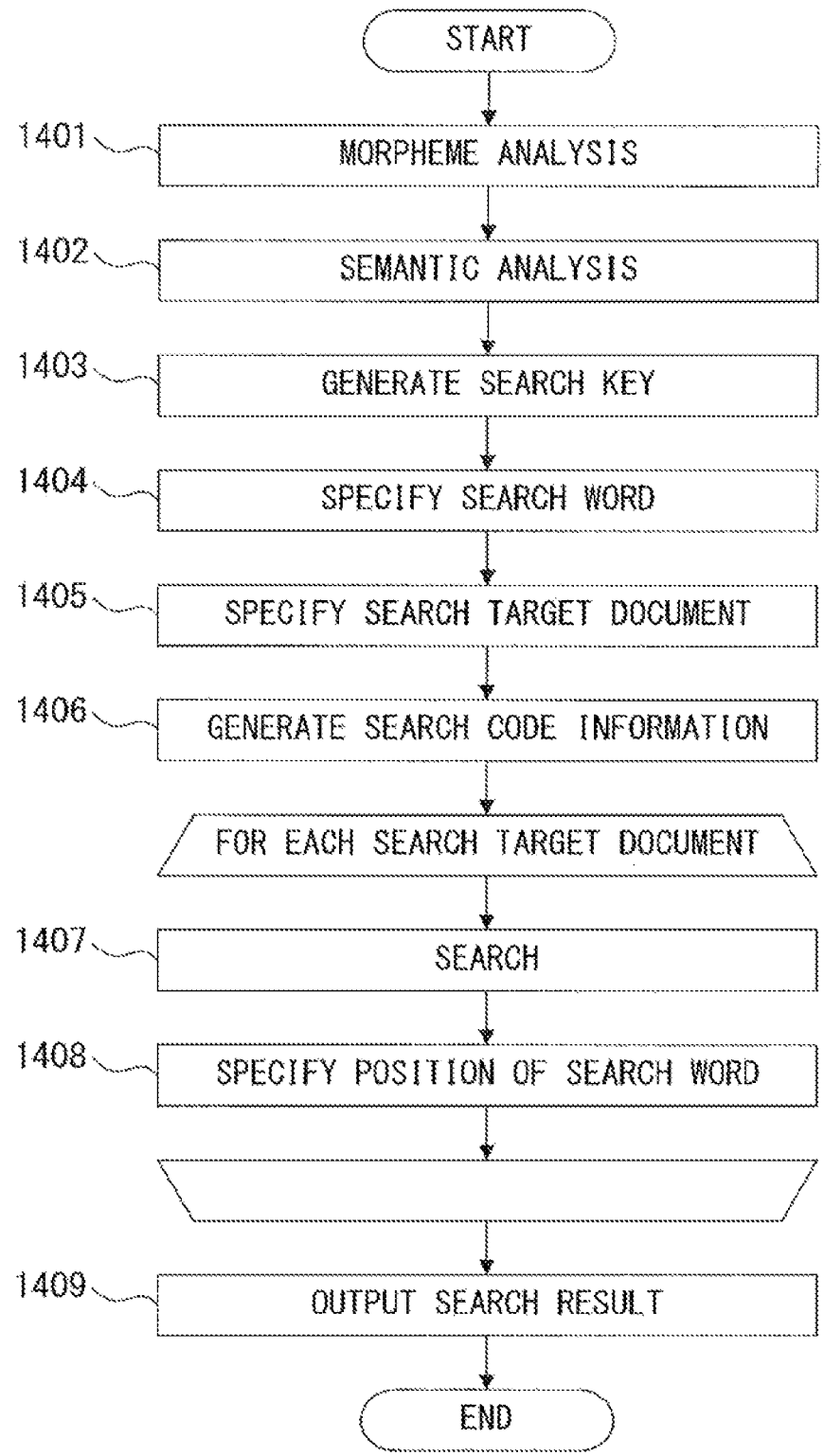
F I G. 14

FIG. 15A

| DOCUMENT ID | DICTIONARY ID | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... | 82 | ... | 522 | ... | 9283 |
|---|---|---|---|---|---|---|---|---|---|---|---|---|---|---|---|---|---|---|---|---|---|---|---|---|---|---|---|---|---|---|---|---|---|
| ENTRY | | | | | | | | | | | | | | | | | | | | | | | | | | | | | | | | | |
| AGE+VERB+GIVE | 1088 | 0 | 1 | 0 | 1 | 1 | 0 | 1 | 1 | 1 | 0 | 0 | 1 | 0 | 1 | 0 | 0 | 1 | 0 | 0 | 0 | 1 | 0 | 0 | 1 | 0 | 0 | ... | 0 | ... | 0 | ... | 0 |
| HANAKO+NOUN+HANAKO | 200291 | 0 | 0 | 0 | 1 | 0 | 0 | 0 | 1 | 0 | 0 | 1 | 0 | 0 | 1 | 0 | 1 | 0 | 1 | 0 | 1 | 0 | 0 | 1 | 1 | 0 | 0 | ... | 1 | ... | 1 | ... | 1 |
| AND OPERATION RESULT | 1088&200291 | 0 | 0 | 0 | 1 | 0 | 0 | 0 | 1 | 0 | 0 | 0 | 0 | 0 | 1 | 0 | 0 | 0 | 0 | 0 | 0 | 0 | 0 | 0 | 1 | 0 | 0 | ... | 0 | ... | 0 | ... | 0 |

FIG. 15B

| DOCUMENT ID | DICTIONARY ID | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... | 82 | ... | 522 | ... | 9283 |
|---|---|---|---|---|---|---|---|---|---|---|---|---|---|---|---|---|---|---|---|---|---|---|---|---|---|---|---|---|---|---|---|---|---|
| ENTRY | | | | | | | | | | | | | | | | | | | | | | | | | | | | | | | | | |
| ATAE+VERB+GIVE | 2183 | 0 | 1 | 0 | 0 | 0 | 0 | 0 | 0 | 0 | 1 | 1 | 0 | 1 | 0 | 0 | 0 | 0 | 1 | 0 | 0 | 0 | 1 | 1 | 1 | 0 | 1 | ... | 0 | ... | 1 | ... | 0 |
| HANAKO+NOUN+HANAKO | 200291 | 0 | 0 | 0 | 1 | 0 | 0 | 0 | 1 | 0 | 0 | 1 | 0 | 0 | 1 | 0 | 1 | 0 | 1 | 0 | 1 | 0 | 0 | 1 | 1 | 0 | 0 | ... | 1 | ... | 1 | ... | 1 |
| AND OPERATION RESULT | 2183&200291 | 0 | 0 | 0 | 0 | 0 | 0 | 0 | 0 | 0 | 0 | 1 | 0 | 0 | 0 | 0 | 0 | 0 | 1 | 0 | 0 | 0 | 0 | 1 | 1 | 0 | 0 | ... | 0 | ... | 1 | ... | 0 |

FIG. 15C

| DOCUMENT ID | DICTIONARY ID | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... | 82 | ... | 522 | ... | 9283 |
|---|---|---|---|---|---|---|---|---|---|---|---|---|---|---|---|---|---|---|---|---|---|---|---|---|---|---|---|---|---|---|---|---|---|
| ENTRY | | | | | | | | | | | | | | | | | | | | | | | | | | | | | | | | | |
| ZOUYO+INFLECTED FORM OF NOUN+GIVE | 4021 | 0 | 1 | 0 | 0 | 0 | 1 | 0 | 0 | 0 | 0 | 0 | 0 | 0 | 0 | 0 | 0 | 0 | 0 | 1 | 0 | 0 | 0 | 0 | 0 | 0 | 0 | ... | 0 | ... | 0 | ... | 1 |
| HANAKO+NOUN+HANAKO | 200291 | 0 | 0 | 0 | 1 | 0 | 0 | 0 | 1 | 0 | 0 | 1 | 0 | 0 | 1 | 0 | 1 | 0 | 1 | 0 | 1 | 0 | 0 | 1 | 1 | 0 | 0 | ... | 1 | ... | 1 | ... | 1 |
| AND OPERATION RESULT | 4021&200291 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | ... | 0 | ... | 0 | ... | 1 |

FIG. 15D

| DOCUMENT ID | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... | 82 | ... | 522 | ... | 9283 |
|---|---|---|---|---|---|---|---|---|---|---|---|---|---|---|---|---|---|---|---|---|---|---|---|---|---|---|---|---|---|---|---|---|---|
| ENTRY | DICTIONARY ID | | | | | | | | | | | | | | | | | | | | | | | | | | | | | | | | |
| KIFU+INFLECTED FORM OF NOUN+GIVE | 5911 | 1 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | ... | 0 | ... | 0 | ... | 0 |
| HANAKO→NOUN+HANAKO | 200291 | 0 | 0 | 0 | 1 | 0 | 0 | 0 | 0 | 0 | 1 | 0 | 0 | 0 | 1 | 1 | 0 | 0 | 1 | 0 | 0 | 0 | 0 | 0 | 0 | 1 | 0 | ... | 0 | ... | 1 | ... | 1 |
| AND OPERATION RESULT | 5911&200291 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | ... | 0 | ... | 0 | ... | 0 |

FIG. 15E

| DOCUMENT ID | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... | 82 | ... | 522 | ... | 9283 |
|---|---|---|---|---|---|---|---|---|---|---|---|---|---|---|---|---|---|---|---|---|---|---|---|---|---|---|---|---|---|---|---|---|---|
| ENTRY | DICTIONARY ID | | | | | | | | | | | | | | | | | | | | | | | | | | | | | | | | |
| TEWATASHI+VERB+GIVE | 9827 | 0 | 1 | 0 | 0 | 1 | 0 | 0 | 0 | 0 | 0 | 0 | 0 | 0 | 0 | 1 | 0 | 0 | 1 | 0 | 0 | 0 | 0 | 0 | 0 | 0 | 0 | ... | 1 | ... | 0 | ... | 0 |
| HANAKO→NOUN+HANAKO | 200291 | 0 | 0 | 0 | 1 | 0 | 0 | 0 | 0 | 0 | 1 | 0 | 0 | 0 | 1 | 1 | 0 | 0 | 1 | 0 | 0 | 0 | 0 | 0 | 0 | 1 | 0 | ... | 1 | ... | 1 | ... | 1 |
| AND OPERATION RESULT | 9827&200291 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | ... | 1 | ... | 0 | ... | 0 |

| SEARCH FORMULA | DOCUMENT ID |
|---|---|
| (1088 AND 200291) | 3 |
| (2183 AND 200291) | 24,522 |
| (4021 AND 200291) | 9283 |
| (5911 AND 200291) | NONE |
| (9827 AND 200291) | 82 |

FIG. 16

| SEARCH FORMULA | SCORE OF SEARCH FORMULA |
|---|---|
| (1088 AND 200291) | 302.387 |
| (2183 AND 200291) | 503.223 |
| (4021 AND 200291) | 609.329 |
| (5911 AND 200291) | 691.812 |
| (9827 AND 200291) | 904.661 |

F I G. 1 8

| SEARCH FORMULA | SCORE OF SEARCH FORMULA |
|---|---|
| (1088 AND 200291) | 539.372 |
| (2183 AND 200291) | |
| (4021 AND 200291) | |
| (5911 AND 200291) | |
| (9827 AND 200291) | |

FIG. 19

SEMANTIC STRUCTURE SEARCH DEVICE AND SEMANTIC STRUCTURE SEARCH METHOD

CROSS-REFERENCE TO RELATED APPLICATION

This application is a divisional of U.S. application Ser. No. 14/995,775, filed Jan. 14, 2016, which is based upon and claims the benefit of priority of the prior Japanese Patent Application No. 2015-008936, filed on Jan. 20, 2015, the entire contents of each are incorporated herein by reference.

FIELD

The embodiments discussed herein are related to a semantic structure search device and a semantic structure search method.

BACKGROUND

In recent years, the importance of text searches has been increasing accompanying the explosive increase in text data volumes. Particularly, as research on semantic processing for secretarial function application software etc. has been becoming active, searches for semantic structures of natural sentences have been becoming important more and more.

Analyses of natural sentences conducted in text searches utilize lexical analyses, morpheme analyses, semantic analyses, etc. A lexical analysis is a process of dividing a character string into words, while a morpheme analysis is a process of dividing a character string into morphemes and assigning information such as word classes, attributes, etc. to each morphemes. Morphemes obtained through morpheme analyses may be treated as words.

A semantic analysis is a process of using a result of a morpheme analysis of a natural sentence so as to obtain the semantic structure of that natural sentence. By using a semantic structure, which is a result of semantic analyses, what is meant by a natural sentence can be expressed as data, which is processed by computers.

A semantic structure includes a plurality of semantic symbols respectively representing the meanings of a plurality of words included in a morpheme analysis result, and also includes information representing the relationship between two semantic symbols. In some cases, one semantic symbol corresponds to a plurality of words. A semantic structure can be represented by for example a directed graph having a plurality of nodes representing a plurality of semantic symbols and also having an arc representing the relationship between two nodes. The smallest partial structure of a semantic structure is referred to as a semantic minimum unit and includes two nodes and an arc between those nodes.

By conducting a morpheme analysis and a semantic analysis on text data included in a plurality of documents, it is possible to realize a semantic structure search that searches for a plurality of documents by using a semantic structure of a search request for a natural sentence.

However, a semantic structure, which is a result of a semantic analysis of text data, is several tens of times larger in data volume than the original text data. Further, a semantic structure search is a complicated process, sometimes leading to a situation where data that is the result of a semantic analysis is to be compressed for a semantic structure search.

An information search device that uses a semantic minimum unit as a search key for a semantic structure search of a natural sentence is also known (see Patent Document 1, for example). This information search device accepts a search query of a natural language sentence, conducts a semantic analysis on that natural language sentence, and specifies the semantic minimum unit that serves as a search key. Then, the information search device searches for a search target sentence including a semantic minimum unit that is identical to the search key from a searching index that has in advance stored semantic minimum units included in the search target sentence.

An information search device that uses results obtained by a sentence-meaning-oriented search in order to efficiently realize display that is easy to understand is also known (see Patent Document 2 for example). This information search device compares, on the basis of match profile information, a search key sentence and the match dictionary information in accordance with an associated matching condition, and obtains positional information that represents the position in which a word meeting the matching condition appears in sentences of the match dictionary information. Then, on the basis of the obtained result of the comparison, the information search device transmits, to a terminal device, search result information in which a sentence including a word meeting the matching condition and the positional information are associated.

An information processing program that can increase the efficiency of compression of character codes and accelerate the speed of a compression process and an expansion process is also known (See Patent Document 3 for example). A generation program that can construct a $2^N$ branch nodeless Huffman tree in which the optimum code length is assigned to the total number of types of pieces of character information etc. is also known (see Patent Document 4 for example). An information generation program that can accelerate the generation of index information representing presence or absence of basic words or characters and optimize the size of index information is also known (see Patent Document 5 for example).

Patent Document 1: Japanese Laid-open Patent Publication No. 2013-186766
Patent Document 2: Japanese Laid-open Patent Publication No. 2010-267247
Patent Document 3: Japanese Laid-open Patent Publication No. 2010-93414
Patent Document 4: International Publication Pamphlet No. WO 2012/111078
Patent Document 5: International Publication Pamphlet No. WO 2011/148511

SUMMARY

According to an aspect of the embodiments, a non-transitory computer-readable recording medium stores a semantic structure search program. The semantic structure search program causes the computer to execute the following process.

(1) The computer generates a plurality of search semantic symbols from a search request.

(2) The computer specifies a position of a specific word that corresponds to the search request in a search target document, by the plurality of search semantic symbols and document semantic structure position information. The document semantic structure position information includes a relationship information between a plurality of semantic symbols and a plurality of positions of a plurality of words in the search target document. The plurality of semantic symbols represent a semantic structure corresponding to the plurality of words.

(3) The computer outputs a search result including the specific word and the position of the specific word in the search target document.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an analysis result of a document;

FIG. 6 illustrates a first example of semantic symbol information;

FIG. 7 illustrates a second example of semantic symbol information;

FIG. 9 illustrates mapping information;

FIG. 10 illustrates bit map information;

FIG. 11A and FIG. 11B illustrate semantic codes;

FIG. 12 illustrates a flowchart of an encoding process;

FIG. 13 illustrates document semantic structure position information;

FIG. 14 illustrates a flowchart as a specific example of a semantic structure search process;

FIG. 15A through FIG. 15E illustrate logical products of two rows of bit map information;

FIG. 16 illustrates document IDs obtained through logical products of two rows;

FIG. 18 illustrates a first example of scores of search formulas;

FIG. 19 illustrates a second example of scores of search formulas; and

DESCRIPTION OF EMBODIMENTS

Figure 1:
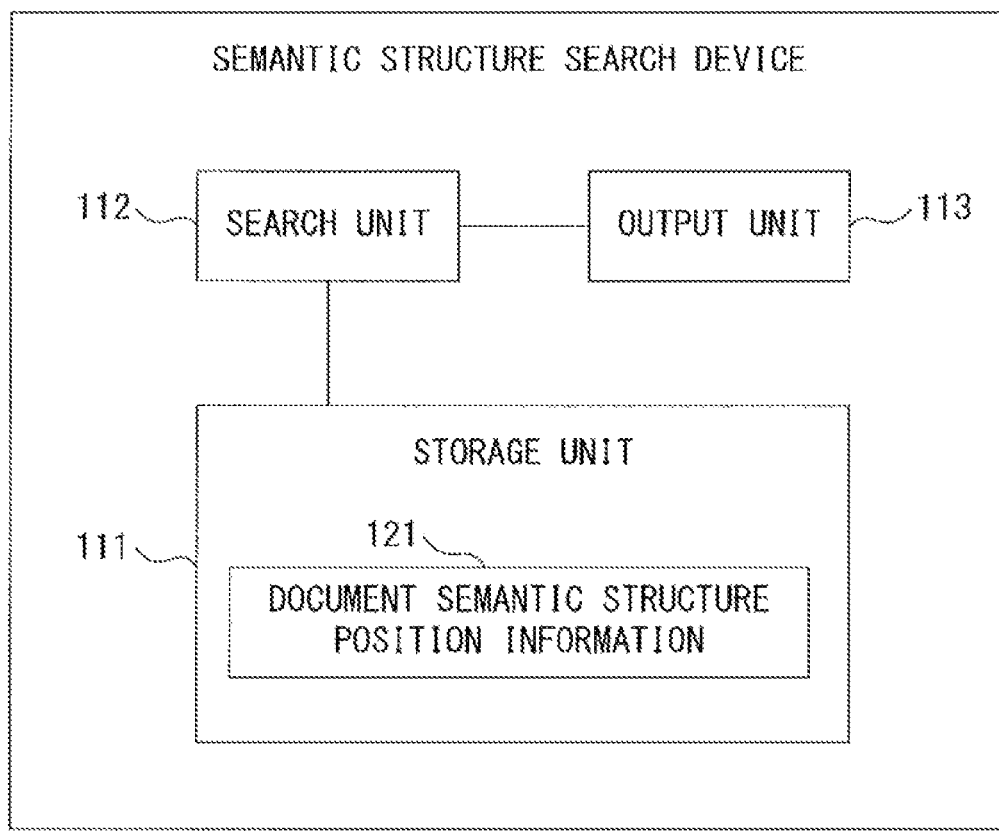
FIG. 1 illustrates a functional configuration of a semantic structure search device.

Hereinafter, the embodiments will be explained in detail by referring to the drawings.

The conventional semantic structure searches have the following problems.

Because a morpheme analysis result and a semantic analysis result for a document are not associated, even when the semantic minimum unit has been searched for in a semantic structure search, the correspondence relationship between a semantic symbol included in the semantic minimum unit and a word included in the original sentence is not known. Accordingly, a word corresponding to a semantic symbol that was searched for is obtained on the basis of information representing the corresponding relationship between the semantic symbol and a word included in the original sentence, and the text corresponding to the position of that word is referred to. In such a case, a process of obtaining a word corresponding a semantic symbol is performed in addition to the semantic structure search, leading to a longer period of processing time.

In a case, as a preprocess for a semantic structure search, when information including both the correspondence relationship between the morpheme analysis result and the original sentence and the correspondence relationship between the semantic structure analysis result and the morpheme analysis result is to be generated, the size of the information to be generated becomes immense, leading to a longer period of processing time, which is against the intention. Accordingly, it is desirable to associate the semantic structure and the original sentence efficiently in a semantic structure search.

Patent Document 2 also discloses construction of a tree structure by using, as a partial tree node, a sentence including phrases consisting of words. However, when information of a tree structure is searched for, the period of processing time becomes longer.

Note that these problems arise not only when the semantic minimum unit is searched for from a semantic structure but also when a partial structure including three or more semantic symbols is searched for from a semantic structure.

FIG. 1 illustrates a functional configuration example of a semantic structure search device according to an embodiment. A semantic structure search device 101 includes a storage unit 111, a search unit 112 and an output unit 113 (output interface). The storage unit 111 stores document semantic structure position information 121 that includes a relationship information between a plurality of semantic symbols and a plurality of positions of a plurality of words in the search target document. The plurality of semantic symbols represent a semantic structure corresponding to the plurality of words. The search unit 112 refers to the document semantic structure position information 121 so as to perform a semantic structure search process based on a search request, and the output unit 113 outputs the search result.

Figure 2:
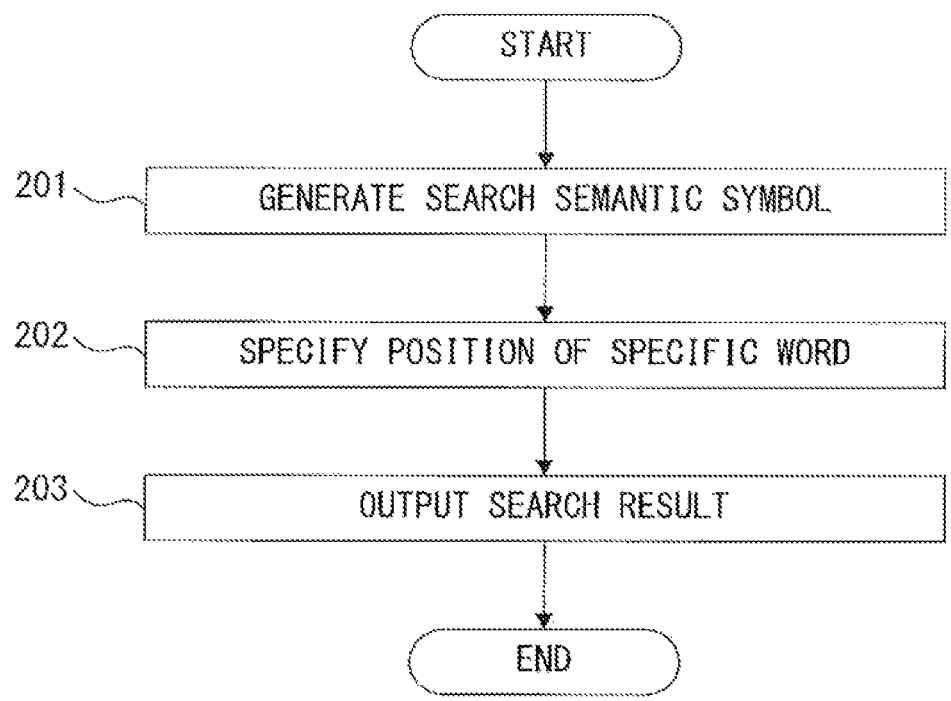
FIG. 2 is a flowchart illustrating a semantic structure search process.

FIG. 2 is a flowchart illustrating an example of a semantic structure search process performed by the semantic structure search device 101 illustrated in FIG. 1. First, the search unit 112 generates a plurality of search semantic symbols from a search request (step 201). Next, the search unit 112 refers to the document semantic structure position information 121 so as to specify a position of a specific word that corresponds to the search request in the search target document, by the plurality of search semantic symbols and the document semantic structure position information (step 202). Then, the output unit 113 outputs the search result including the specific word and the position of the specific word in the search target document (step 203).

By using the semantic structure search device 101 illustrated in FIG. 1, it is possible to specify a word corresponding to a search request and the position of that word in the document in a semantic structure search.

Figure 3:
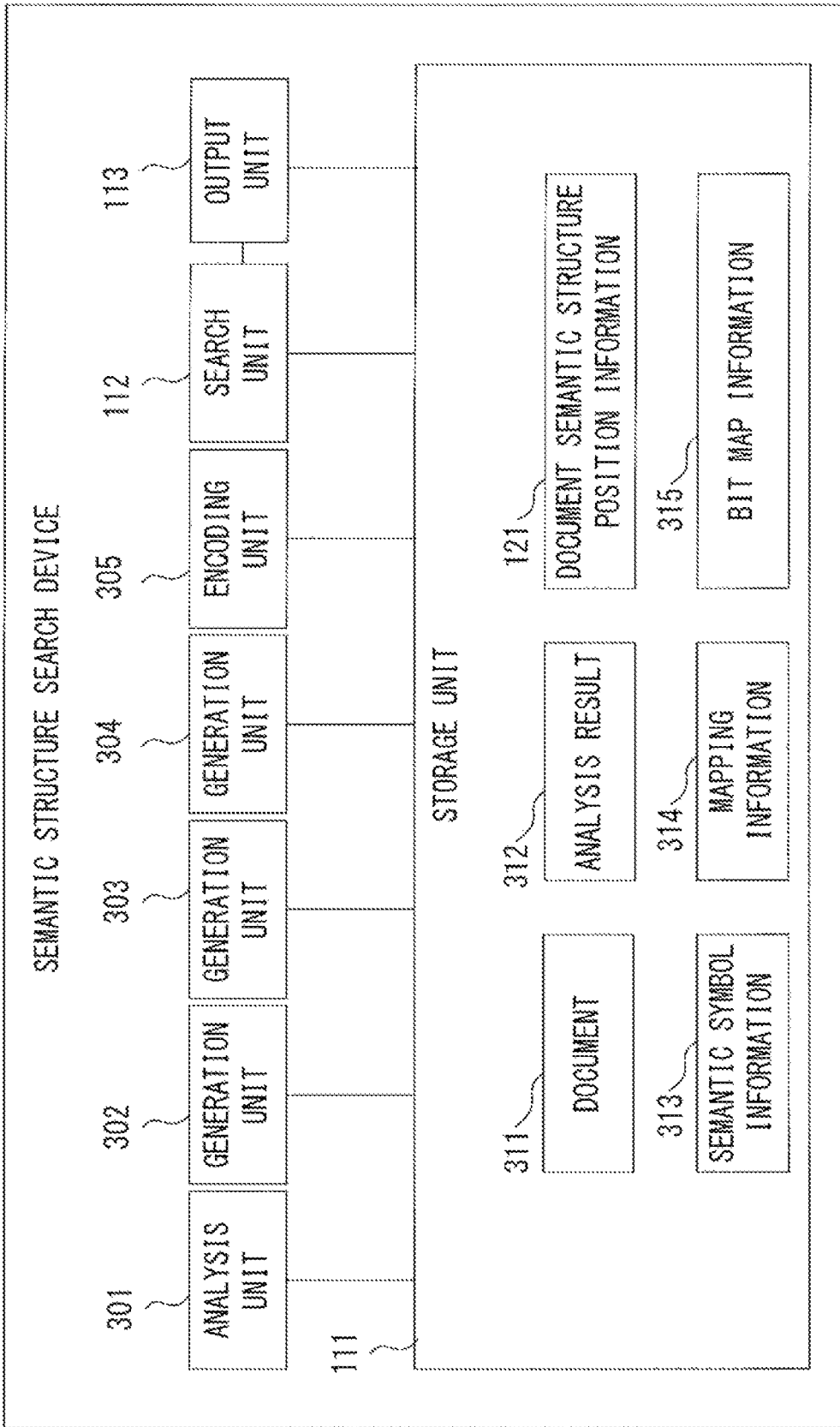
FIG. 3 illustrates a specific example of the functional configuration of the semantic structure search device.

FIG. 3 illustrates a specific example of the semantic structure search device 101 illustrated in FIG. 1. The semantic structure search device 101 illustrated in FIG. 3 includes the storage unit 111, the search unit 112, the output unit 113, an analysis unit 301, generation units 302, 303 and 304, and an encoding unit 305.

The analysis unit 301 conducts a morpheme analysis and a semantic analysis on each of a plurality of documents 311 stored in the storage unit 111, generates an analysis result 312 including a morpheme analysis result and a semantic analysis result, and stores them in the storage unit 111. The generation unit 302 generates semantic symbol information 313 representing a correspondence relationship between a word and a semantic symbol from the analysis result 312.

The generation unit 303 generates mapping information 314, which represents a correspondence relationship between a word and code information from the analysis result 312 and the semantic symbol information 313, and stores the information in the storage unit 111. The generation unit 304 generates bit map information 315, which represents presence or absence of each of a plurality of words in each document 311 from the analysis result 312 and the semantic symbol information 313, and stores the information in the storage unit 111. The encoding unit 305 encodes each document 311 by using the analysis result 312, the semantic symbol information 313 and the mapping information 314 so as to generate the document semantic structure position information 121 for each document 311 and store the information in the storage unit 111.

The search unit 112 refers to the document semantic structure position information 121, the analysis result 312, the semantic symbol information 313, the mapping information 314 and the bit map information 315 so as to perform a semantic structure search process based on the search request.

First, by referring to FIG. 4 through FIG. 13, explanations will be given for a compression process that is conducted for compressing data of the document 311.

Figure 4:
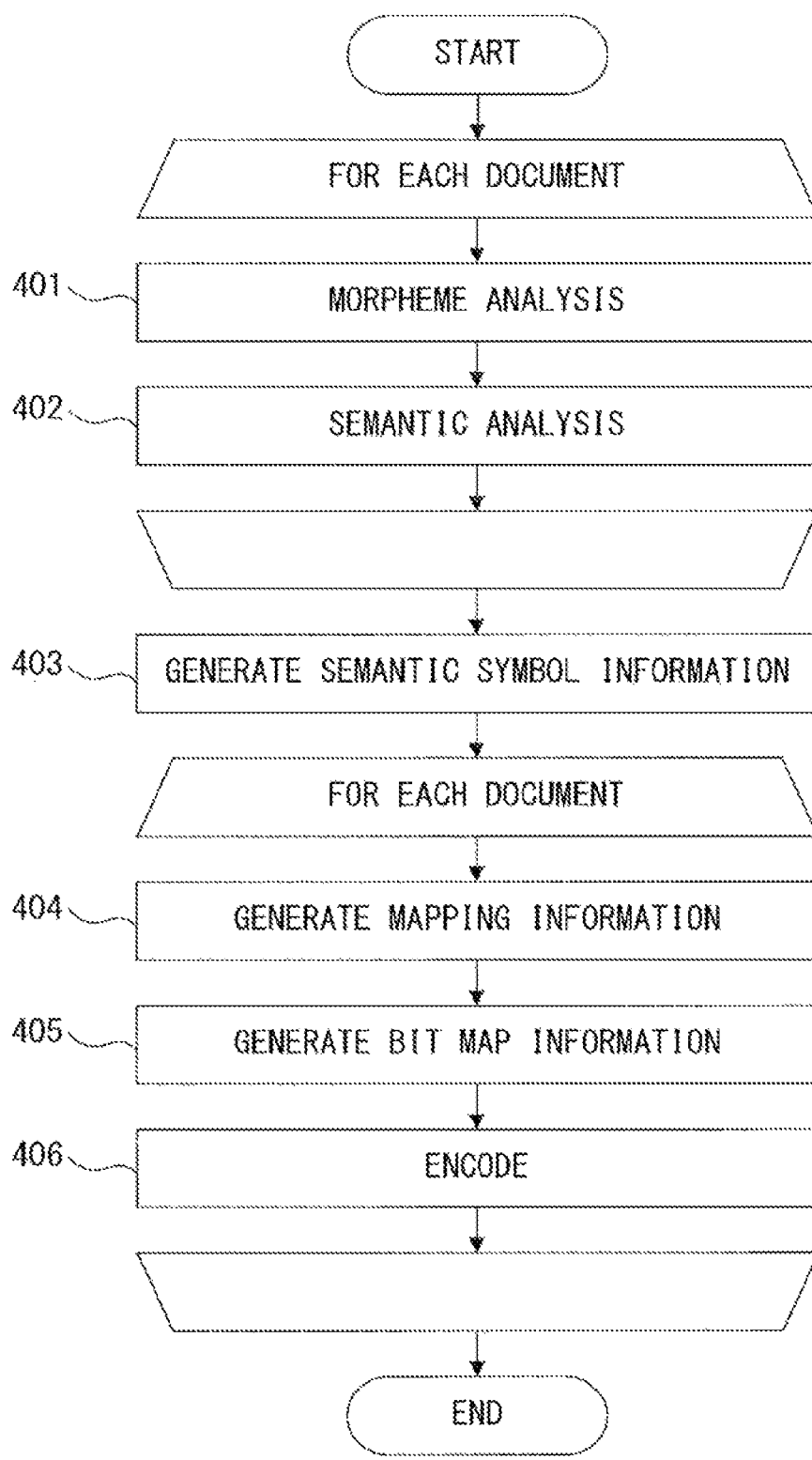
FIG. 4 is a flowchart of a compression process.

FIG. 4 is a flowchart illustrating an example of a compression process performed by the semantic structure search device 101 illustrated in FIG. 3. First, the analysis unit 301 conducts a morpheme analysis on the document 311 so as to generate a morpheme analysis result (step 401), and also conducts a semantic analysis on the document 311 so as to generate a semantic analysis result (step 402). Then, the analysis unit 301 stores, in the storage unit 111, the analysis result 312 including the morpheme analysis result and the semantic analysis result. The processes of steps 401 and 402 are performed for each document 311.

Next, the generation unit 302 generates the semantic symbol information 313 from the analysis result 312, and stores the information in the storage unit 111 (step 403).

Next, the generation unit 303 generates the mapping information 314 for the document 311 from the analysis result 312 and the semantic symbol information 313, and stores the information in the storage unit 111 (step 404). Next, the generation unit 304 generates the bit map information 315 for the document 311 from the analysis result 312 and the semantic symbol information 313 and stores the information in the storage unit 111 (step 405). Then, the encoding unit 305 encodes the document 311 by using the analysis result 312, the semantic symbol information 313 and the mapping information 314 so as to generate the document semantic structure position information 121, and stores the information in the storage unit 111 (step 406). The processes in steps 404 through 406 are performed for each document 311.

FIG. 5 illustrates an example of a text file corresponding to the analysis result 312 of the document 311, the text file being generated in steps 401 and 402 illustrated in FIG. 4. A text file 501 illustrated in FIG. 5 includes an analysis result 502 of each sentence included in the document 311, and the analysis result 502 of each sentence includes a morpheme analysis result 511 and a semantic analysis result 512.

The morpheme analysis result 511 includes a word 521 included in a sentence, a document ID 522, a sentence ID 523, a word position 524 in the sentence, word data length 525, a semantic symbol 526 corresponding to the word, and attribute information 527. The attribute information 527 includes information representing for example the word class of the word, whether or not the word is a categorematic word, etc. In some cases, one morpheme obtained through a morpheme analysis may be treated as one word, and in other cases, a compound word consisting of a plurality of morphemes may be treated as one word.

For example, the document ID 522 and the sentence ID 523 of "GYOUMU" (meaning "business" in English) is "7502" and "4", respectively. The word position 524 of "GYOUMU" represents the position corresponding to "6" bytes from the beginning of the sentence, while the data length 525 represents "4" bytes. The semantic symbol 526 of "GYOUMU" is "BUSINESS=GYOUMU", and the attribute information 527 is ":N:IW)". "N" in the attribute information 527 represents a noun, and "IW" represents a categorematic word.

The semantic analysis result 512 includes a semantic minimum unit 531 included in a sentence, a document ID 532, a sentence ID 533, a phrase 534 corresponding to the semantic minimum unit, a starting position 535 of a phrase in the sentence and an ending position 536 of the phrase. The semantic minimum unit 531 includes a source node, a termination node and an arc starting from the source node to the termination node. The semantic analysis result 512 further includes a starting position 537 of a word corresponding to the source node, an ending position 538 of the word corresponding to the source node, a starting position 539 of a word corresponding to the termination node and an ending position 540 of the word corresponding to the termination node.

For example, the source node of semantic minimum unit "INTERNET=7--<CONCERN>-->ENTREPRENEUR" is "INTERNET=7", the termination node is "ENTREPRENEUR", and the arc is "--<CONCERN>-->".

The document ID 532, the sentence ID 533 and the phrase 534 of this semantic minimum unit are "7502", "4" and "JIGYOUSHA NO DETASENTA TO INTANETTO", respectively. The starting position 535 of "JIGYOUSHA NO DETASENTA TO INTANETTO" represents the position corresponding to "42" bytes from the beginning of the sentence and the ending position 536 represents the position corresponding to "78" bytes from the beginning of the sentence.

The starting position 537 of word "INTANETTO" corresponding to the source node represents the position corresponding to "64" bytes from the beginning of the sentence and the ending position 538 represents the position corresponding to "78" bytes from the beginning of the sentence. The starting position 539 of word "JIGYOUSHA" corresponding to the termination node represents the position corresponding to "42" bytes from the beginning of the sentence and the ending position 540 represents the position corresponding to "48" bytes from the beginning of the sentence.

FIG. 6 illustrates a first example of a word code dictionary corresponding to the semantic symbol information 313 that is generated in step 403 illustrated in FIG. 4. The word code dictionary illustrated in FIG. 6 represents a correspondence relationship between a dictionary ID and an entry. An entry includes a word, attribute information and a semantic symbol, and a dictionary ID represents a word code added to an entry. By referring to a word code dictionary like this, it is possible to compress the document 311 by replacing a word specified by an entry with a word code specified by a dictionary ID.

For example, in entry "HONYAKU+noun+abstract thing+TRANSLATION" that corresponds to dictionary ID "5023", "HONYAKU" is a word, "noun" and "abstract thing" are attribute information, and "TRANSLATION" is a semantic symbol. "noun" represents a word class, and "abstract thing" represents a category of a word. The word code dictionary illustrated in FIG. 6 also represents a correspondence relationship between a word and a semantic symbol.

It is made possible to distinguish a plurality of same word having different meanings by using a combination of a word, attribute information and a semantic symbol as an entry of a word code dictionary.

FIG. 7 illustrates a second example of a word code dictionary corresponding to the semantic symbol information 313. The word code dictionary illustrated in FIG. 7 has a configuration in which semantic symbols have been removed from the entries illustrated in FIG. 6. In such a case, as the semantic symbol information 313, a word dictionary representing a correspondence relationship between a combination of a word and attribute information and a semantic symbol is used together with a word code dictionary. By referring to the word code dictionary illustrated in FIG. 7 and a word dictionary, it is possible to uniquely determine a correspondence relationship between a dictionary ID and a semantic symbol.

Figure 8:
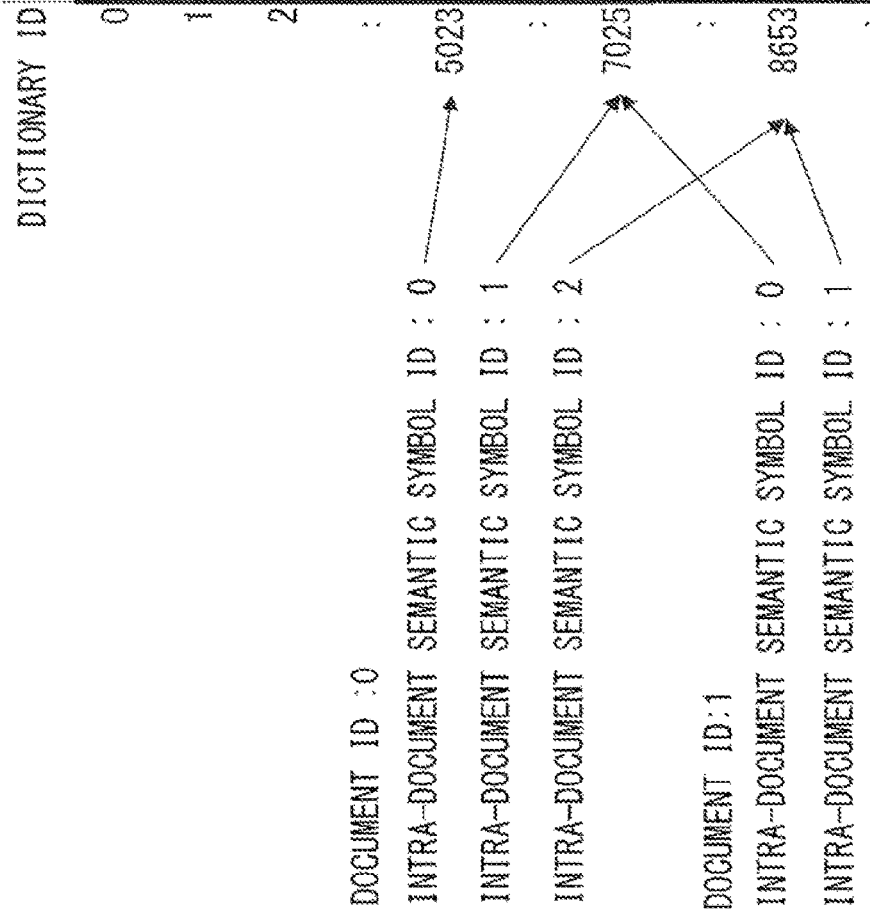
FIG. 8 illustrates a role of mapping information.

FIG. 8 illustrates a role of the mapping information 314 generated in step 404 illustrated in FIG. 4. The mapping information 314 represents a correspondence relationship between code information (intra-document semantic symbol ID) representing a semantic symbol that corresponds to each word included in each document 311 and the dictionary ID of a word code dictionary.

For example, intra-document semantic symbol ID "0" of document ID "0" is associated with dictionary ID "5023" while intra-document semantic symbol ID "1" is associated with dictionary ID "7025". Intra-document semantic symbol ID "2" is associated with dictionary ID "8653".

Also, intra-document semantic symbol ID "0" of document ID "1" is associated with dictionary ID "7025" while intra-document semantic symbol ID "1" is associated with dictionary ID "8653".

Even when the number of entries in a word code dictionary is immense, the total number of semantic symbols corresponding to words included in one sentence is limited, and accordingly intra-document semantic symbol IDs can be expressed by data of a length shorter than that of the dictionary ID. In view of this, by replacing the dictionary ID with intra-document semantic symbol IDs by using the mapping information 314, it is possible to increase the rate of compression based on encoding of words. For example, when an integer equal to or greater than zero is used as an intra-document semantic symbol ID, the maximum number can be suppressed to several hundred through several thousand.

Next, an example of a process of generating the mapping information 314 will be explained. The generation unit 303 sequentially reads the analysis result 312 of each document 311, assigns an intra-document semantic symbol ID to each semantic symbol and associates the intra-document semantic symbol IDs with dictionary IDs so as to generate the mapping information 314.

First, the generation unit 303 allocates a memory space for the mapping information 314. In a case of C language for example, the generation unit 303 uses an operator "new" so as to secure the array below.

unsigned int mapping_dic[number of documents][MAX_DOCWORD]#define MAX_DOCWORD 1024

MAX_DOCWORD defines the maximum value for the total number of semantic symbols included in one document 311 and mapping_dic[i] [j] represents the dictionary ID corresponding to the semantic symbol of intra-document semantic symbol ID "j" appearing in the document 311 with document ID "i".

Next, the generation unit 303 secures the following array by an operator "new".
int mapping_dic_index[number of documents]
mapping_dic_index[i] represents the total number of semantic symbols appearing in the document 311 with document ID "i".

Next, the generation unit 303 reads the analysis result 312 of one document 311, generates a semantic symbol list of that document 311, and assigns intra-document semantic symbol IDs in that document 311 in accordance with the order of the dictionary IDs.

For example, the semantic symbols appearing in document 311 with document ID "0" are "WORK", "TRANSLATOR" and "TRANSLATION", the corresponding dictionary IDs are "7025", "8653" and "5023", respectively from the word code dictionary illustrated in FIG. 8. When these dictionary IDs are sorted in the ascending order, the result is "5023", "7025" and "8653". Accordingly, the following intra-document semantic symbol IDs are assigned to the respective semantic symbols.
mapping_dic[0] [0]=5023;
mapping_dic[0] [1]=7025;
mapping_dic[0] [2]=8653;

Also, the total number of the semantic symbols appearing in the document 311 with document ID "0" is "3", which results in mapping_dic_index[0]=3.

When the generation of mapping_dic[i] [j] and mapping_dic_index[i] has been terminated for all of the documents 311, the generation unit 303 outputs the generated two arrays to the following two files corresponding to the mapping information 314.

(1) File map.dic
The content of mapping_dic[i] [j] is output to file map.dic as below.

```
for(i=0;i<number of documents;i++){
    fwrite(&mapping_dic[i],mapping_dic_index[i],
    sizeof(unsigned int),fp_map_dic);
}
```

(2) File map.idx
The content of mapping_dic_index [i] is output to file map.idx as below.

```
int loc=0;
for(i=0;i<number of documents;i++){
    loc+=mapping_dic_index[i];
    fwrite(&loc,1,sizeof(int),fp_map_idx);
}
```

FIG. 9 illustrates an example of the mapping information 314 generated in the above manner. "OFFSET" of file map.idx represents the document ID, and the "CONTENT" of file map.idx represents the offset of file map.dic. "OFFSET" of file map.dic represents the position corresponding to the intra-document semantic symbol ID of each semantic symbol, and "CONTENT" of file map.dic represents the dictionary ID.

When for example document ID "n" and intra-document semantic symbol ID "x" have been given, it is possible to obtain offset "m" of map.dic corresponding to document ID "n" by referring to the position of offset "n" of map.idx and obtaining content "m". Then, by referring to the position of offset "m+x" of map.dic so as to obtain the content, the dictionary ID corresponding to intra-document semantic symbol ID "x" can be obtained.

When document ID "1" and intra-document semantic symbol ID "1" have been given, it is possible to obtain offset "3" of map.dic corresponding to document ID "1" by referring to the position of offset "1" of map.idx and obtaining content "3". Then, by referring to the position of offset "3+1=4" of map.dic and obtaining the content, the dictionary ID "8653" corresponding to intra-document semantic symbol ID "1" can be obtained.

FIG. 10 illustrates an example of the bit map information 315 generated in step 405 in FIG. 4. The bit map information 315 illustrated in FIG. 10 represents presence or absence of a word registered in the word code dictionary in the sentence specified by a document ID. Logic "1" represents the presence of such a word and logic "0" represents the absence of such a word.

For example, a word corresponding to dictionary ID "1088" is not included in the document 311 with document ID "0", and is included in the document 311 with document ID "1". By using the bit map information 315 like this, it is possible to narrow the documents 311 including a specified word from among many documents 311 at a high speed.

Next, explanations will be given for an example of the encoding process in step 406 in FIG. 4. The encoding unit 305 uses intra-document semantic symbol IDs so as to encode the semantic structures of the document 311, and thereby generates the document semantic structure position information 121.

The semantic structures of the document 311 are expressed by a semantic minimum unit and semantic minimum units are categorized into the following three patterns.
Pattern 1: (node 1, node 2, arc)
Pattern 2: (node 1, NIL, arc)
Pattern 3: (NIL, node 1, arc)

Node 1 and node 2 of pattern 1 represent the source node and the termination node, respectively, NIL of pattern 2 indicates that a termination node does not exist, and NIL of pattern 3 indicates that a source node does not exist.

A pattern type can be expressed by a code of two bits. Also, when the total number of the types of words included in one document 311 is equal to or smaller than 32768, node 1 and node 2 can be expressed by a code of 15 bits or shorter. However, because the same word can appear a plurality of number of times in one sentence, in order to distinguish such words, it is desirable to add a code of 4 bits for representing the ordinal number of the number of times that the same character has appeared counting from the beginning of a sentence. Also, when the total number of types of arcs used in the semantic minimum unit is equal to or smaller than 256, it is possible to express an arc by using a code of 1 byte (8 bits) or smaller.

FIG. 11A illustrates an example of a unit code representing the semantic minimum unit of pattern 1, and FIG. 11B illustrates an example of a unit code representing the semantic minimum units of patterns 2 and 3.

In the unit code illustrated in FIG. 11A, the first two bits of the first byte represent a pattern type. The next three bits of the first byte and the first one bit of the second byte represent the order of node 1 (ordinal number of the number of times that the same character has appeared counting from the beginning of a sentence among a plurality of the same words). The last three bits of the first byte and the first one bit of the fourth byte represent the order of node 2. The remaining seven bits of the second byte and all the bits of the third byte represent the intra-document semantic symbol ID of node 1, the remaining seven bits of the fourth byte and all the bits of the fifth byte represent the intra-document semantic symbol ID of node 2, and all the bits in the sixth byte represent an arc type. Note that when the order of a node can be represented by three bits and the first one bit of the second byte and the first one bit of the fourth byte are not necessary for representing symbols, it is not necessary to use these bits. In the embodiments described below, a case where the first one bit of the second byte or the first one bit of the fourth byte is not used is explained for the sake of simplicity of explanations.

In the unit code illustrated in FIG. 11B, the first two bits of the first byte represent a pattern type, the next six bits of the first byte represent the order of node 1, the second and third bytes represent the intra-document semantic symbol ID of node 1, and the fourth byte represents an arc type.

By using a unit code as described above, it is possible to represent a semantic minimum unit by using four or six bytes while holding a link between a symbol information of a node in a semantic minimum unit and a word in an original sentence.

FIG. 12 is a flowchart illustrating an example of an encoding process in which one semantic minimum unit is encoded so as to generate a unit code. First, the encoding unit 305 refers to a semantic analysis result included in the analysis result 312, determines the pattern type of the semantic minimum unit (step 1201), and determines the arc type (step 1202).

Next, the encoding unit 305 obtains the orders of nodes included in the semantic minimum unit (step 1203). In the case of pattern 1, the encoding unit 305 obtains the orders of node 1 and node 2, and in the case of patterns 2 and 3, the encoding unit 305 obtains the order of node 1.

Next, the encoding unit 305 obtains intra-document semantic symbol IDs of the nodes (step 1204). In the case of pattern 1, the encoding unit 305 obtains the intra-document semantic symbol IDs of nodes land 2, and in the case of patterns 2 and 3, the encoding unit 305 obtains the intra-document semantic symbol ID of node 1.

For this obtainment, the encoding unit 305 refers to the morpheme analysis result included in the analysis result 312 so as to obtain the word, the attribute information and the semantic symbol corresponding to a node included in the semantic minimum unit. Next, the encoding unit 305 refers to the semantic symbol information 313 (word code dictionary) so as to obtain the dictionary ID corresponding to the combination of the word, the attribute information and the semantic symbol. Then, the encoding unit 305 obtains the intra-document semantic symbol ID from the mapping information 314 on the basis of the document ID and the dictionary ID.

When for example the intra-document semantic symbol ID corresponding to document ID "0" and dictionary ID "5023" is obtained by using the mapping information 314 illustrated in FIG. 9, the encoding unit 305 refers to the position of offset "0" of map.idx so as to obtain content "0". Next, the encoding unit 305 refers to the position of offset "0" of map.dic so as to detect that the content in that position is identical to dictionary ID "5023". In this case, because dictionary ID "5023" has been detected without shifting the referred-to position of i map.dic, the encoding unit 305 determines the intra-document semantic symbol ID to be "0".

Also, when the intra-document semantic symbol ID corresponding to document ID "2" and dictionary ID "35" is to be obtained, the encoding unit 305 refers to the position of offset "2" of map.idx so as to obtain content "5". Next, the encoding unit 305 refers to the position of offset "5" of map.dic and shifts the referred-to position rightwardly from that position one-by-one so as to detect that the content in the position of offset "8" is identical to dictionary ID "35". In such a case, because dictionary ID "35" has been detected just by shifting the referred-to position of map.dic by three, the encoding unit 305 determines the intra-document semantic symbol ID to be "3".

FIG. 13 illustrates an example of the document semantic structure position information 121 generated by an encoding process illustrated in FIG. 12. Unit codes 1301 through 1303 illustrated in FIG. 13 correspond to the unit codes illustrated in FIG. 11A.

For example, pattern type "0" of the unit code 1301 indicates that it is the semantic minimum unit of pattern 1, order "5" of node 1 indicates that it is the fifth word counting from the beginning of the sentence, and order "8" of node 2 indicates that it is the eighth word counting from the beginning of the sentence. The intra-document semantic symbol ID of node 1 is "2", and the intra-document semantic symbol ID of node 2 and the arc type are "29" and "21", respectively.

These unit codes 1301 through 1303 are grouped in the document semantic structure position information 121 for each sentence ID of a sentence to which the unit codes of them belong.

As described above, encoding a word included in a morpheme analysis result and a semantic symbol included in a semantic analysis result of the document 311 as a series of encoding, it is possible to include correspondence relationships between words and semantic symbols to the document semantic structure position information 121 effectively. This makes it possible to directly access words in the original sentence from semantic symbols in the document semantic structure position information 121 that is in a compressed state.

Next, by referring to FIG. 14 through FIG. 19, explanations will be given for a semantic structure search that searches for a semantic structure of the document 311.

FIG. 14 is a flowchart illustrating a specific example of a semantic structure search process performed by the semantic structure search device 101 illustrated in FIG. 3. First, the analysis unit 301 conducts a morpheme analysis on a search request described in a form of a natural sentence so as to generate a morpheme analysis result (step 1401), and also conducts a semantic analysis on the search request so as to generate a semantic analysis result (step 1402). Then, the analysis unit 301 stores in the storage unit 111 the morpheme analysis result and the semantic analysis result conducted on the search request.

Next, the search unit 112 generates a search key including a plurality of search semantic symbols expressing a semantic structure of the search request from the result of the semantic structure analysis conducted on the search request, and stores the search key in the storage unit 111 (step 1403).

Next, the search unit 112 refers to the semantic symbol information 313, and specifies combinations, corresponding to a plurality of search semantic symbols included in the search key, of search words, attribute information thereof and semantic symbols thereof (step 1404). Then, the search unit 112 refers to the bit map information 315 so as to specify at least one search target document including the specified search words (step 1405).

Next, the search unit 112 refers to the semantic symbol information 313 and the mapping information 314 so as to encode the search key, and generates search code information (step 1406).

Next, the search unit 112 searches for a unit code that is identical to the search code information from the document semantic structure position information 121 of the search target document (step 1407). Then, on the basis of the order of the node included in a detected unit code, the position of the search word in the search target document is specified (step 1408). The processes insteps 1407 and 1408 are executed for each search target document.

Next, the output unit 113 outputs a search result (step 1409) that represents the search target document in which a unit code identical to the search code information has been detected, each search word used for the search and the position of each search word in the search target document (step 1409).

When a search request of "TARO WA HANAKO NI HON O A GETA (Taro gave Hanako a book)" has been input, the search unit 112 can generate search keys that represent the following semantic minimum units.
(GIVE, HANAKO, OBJECT)
(GIVE, TARO, SUBJECT)
(GIVE, BOOK, TARGET)

"GIVE" in the search key of (GIVE, HANAKO, OBJECT) represents the semantic symbol of the source node corresponding to "AGE", "HANAKO" in the search key of (GIVE, HANAKO, OBJECT) represents the semantic symbol of the termination node corresponding to "HANAKO", and "OBJECT" represents the arc.

When the document 311 is to be searched by using this search key, the search unit 112 obtains, from the semantic symbol information 313, dictionary IDs and entries respectively corresponding to "GIVE" and "HANAKO", which are included in (GIVE, HANAKO, OBJECT). Thereby, six types of pieces of information as below for example are obtained.
Dictionary ID:1088:AGE+VERB+GIVE
Dictionary ID:2183:ATAE+VERB+GIVE
Dictionary ID:4021:ZOUYO+INFLECTED FORM OF NOUN+GIVE
Dictionary ID:5911:KIFU+INFLECTED FORM OF NOUN+GIVE
Dictionary ID:9827:TEWATASHI+VERB+GIVE
Dictionary ID:200291:HANAKO+NOUN+HANAKO Then, the search unit 112 combines the dictionary ID corresponding to "GIVE" and the dictionary ID corresponding to "HANAKO" so as to generate search formulas as below.
(1088 AND 200291) OR
(2183 AND 200291) OR
(4021 AND 200291) OR
(5911 AND 200291) OR
(9827 AND 200291)

Next, the search unit 112 refers to the bit map information 315 illustrated in FIG. 10 so as to obtain a set of document IDs that satisfy the search formulas. For example, a document ID satisfying (1088 AND 200291) can be obtained by calculating the logical product of the row of "1088" and the row of "200291" in the bit map information 315 as illustrated in FIG. 15A. In such a case, the document ID of the document 311 including "AGE" and "HANAKO" is "3".

The document ID satisfying (2183 AND 200291) can be obtained by calculating the logical product of the rows of "2183" and "200291" in the bit map information 315 as illustrated in FIG. 15B. In such a case, the document IDs of the documents 311 including "ATAE" and "HANAKO" are "24" and "522", respectively.

The document ID satisfying (4021 AND 200291) can be obtained by calculating the local product of the rows of "4021" and "200291" in the bit map information 315 as illustrated in FIG. 15C. In such a case, the document ID the document 311 including "ZOUYO" and "HANAKO" is "9283".

The document ID satisfying (5911 AND 200291) can be obtained by calculating the local product of the rows of "5911" and "200291" in the bit map information 315 as illustrated in FIG. 15D. In such a case, the document 311 including "KIFU" and "HANAKO" does not exist.

The document ID satisfying (9827 AND 200291) can be obtained by calculating the local product of the rows of "9827" and "200291" in the bit map information 315 as illustrated in FIG. 15E. In such a case, the document ID of the document 311 including "TEWATASHI" and "HANAKO" is "82".

FIG. 16 illustrates the document IDs obtained through the logical products illustrated in FIG. 15A through FIG. 15E. As a result, the set of the document IDs satisfying the search formulas is (3, 24, 522, 9283, 82), which means that the number of the search target documents has been narrowed to five.

Next, similarly to step 1204 illustrated in FIG. 12, the search unit 112 replaces the dictionary IDs of the search formulas with intra-document semantic symbol IDs corresponding to the document IDs of the search target documents so as to generate search code information for each search target document. In such a case, when search target documents are different, a piece of search code information is replaced with a different piece of search code information even if the same search formulas are used.

When for example the intra-document semantic symbol ID corresponding to document ID "3" and dictionary ID "1088" by using the mapping information 314 illustrated in FIG. 9 is to be obtained, the search unit 112 refers to the position of offset "3" in map.idx so as to obtain content "11". Next, the search unit 112 refers to the position of offset "11" in map.dic and shifts the referred-to position rightwardly from that position one by one so as to detect that the content in the position of offset "15" is identical to dictionary ID "1088". In such a case, because dictionary ID "1088" has been detected just by shifting the referred-to position by four in map.dic, the search unit 112 determines the intra-document semantic symbol ID to be "4".

When the intra-document semantic symbol ID corresponding to document ID "3" and dictionary ID "200291" is to be obtained, the search unit 112 refers to the position of offset "3" in map.idx so as to obtain content "11". Next, the search unit 112 refers to the position of offset "11" in map.dic and shifts the referred-to position rightwardly from that position one by one so as to detect that the content in the position of offset "22" is identical to dictionary ID "200291". In such a case, because dictionary ID "200291" has been detected just by shifting the referred-to position by eleven in map.dic, the search unit 112 determines the intra-document semantic symbol ID to be "11".

Also, when the intra-document semantic symbol ID corresponding to document ID "24" and dictionary ID "2183" is to be obtained, the search unit 112 refers to the position of offset "24" in map.idx so as to obtain content "1690".

Next, the search unit 112 refers to the position of offset "1690" in map.dic and shifts the referred-to position rightwardly from that position one by one so as to detect that the content in the position of offset "1694" is identical to dictionary ID "2183". In such a case, because dictionary ID "2183" has been detected just by shifting the referred-to position by four in map.dic, the search unit 112 determines the intra-document semantic symbol ID to be "4".

Also, when the intra-document semantic symbol ID corresponding to document ID "24" and dictionary ID "200291" is to be obtained, the search unit 112 refers to the position of offset "24" in map.idx so as to obtain content "1690". Next, the search unit 112 refers to the position of offset "1690" in map.dic and shifts the referred-to position rightwardly from that position one by one so as to detect that the content in the position of offset "1705" is identical to dictionary ID "200291". In such a case, because dictionary ID "200291" has been detected just by shifting the referred-to position by fifteen in map.dic, the search unit 112 determines the intra-document semantic symbol ID to be "15".

In the above manner, search code information as below is generated from the search formulas.

(1088 AND 200291)
→search code information: (4,11) for document ID "3"
(2183 AND 200291)
→search code information: (4,15) for document ID "24"
→search code information: (5,14) for document ID "522"
(4021 AND 200291)
→search code information: (4,10) for document ID "9283"
(9827 AND 200291)
→search code information: (23,106) for document ID "82"

When for example FIG. 13 illustrates the document semantic structure position information 121 with document ID "3", the search unit 112 uses search code information (4, 11) for document ID "3" so as to search the document semantic structure position information 121 illustrated in FIG. 13. Then, the search unit 112 detects the unit code 1303 including intra-document semantic symbol ID "4" of node 1 and intra-document semantic symbol ID "11" of node 2 so as to obtain order "3" of node 1 and order "1" of node 2.

Thereby, it is learned that search word "AGE" corresponding to intra-document semantic symbol ID "4" is the third "AGE" counting from the beginning of the sentence, and search word "HANAKO" corresponding to intra-document semantic symbol ID "11" is the first "HANAKO" counting from the beginning of the sentence.

Then, the search unit 112 refers to the morpheme analysis result (which corresponds to the morpheme analysis result 511 illustrated in FIG. 5) included in the analysis result 312 so as to search the sentence with the sentence ID corresponding to the unit code 1303 for word "AGE", which corresponds to "AGE+VERB+GIVE". Then, the search unit 112 specifies the position, in the search target document, (which corresponds to the word position 524 illustrated in FIG. 5) of the third "AGE" counting from the beginning of the sentence among detected words "AGE" as the position of search word "AGE" in the search target document.

Also, the search unit 112 refers to the morpheme analysis result included in the analysis result 312 so as to search for word "HANAKO", which corresponds to "HANAKO+NOUN+HANAKO" in the sentence with the sentence ID that corresponds to the unit code 1303. Then, the search unit 112 specifies the position of the first "HANAKO" counting from the beginning of the sentence among detected words "HANAKO" as the position of search word "HANAKO" in the search target document.

When the output unit 113 outputs the search result, the output unit 113 may for example conduct emphasized display for the texts of "AGE" and "HANAKO" existing in the specified positions in the search target document.

For N semantic symbols, the total number of combinations of two semantic symbols included in a semantic minimum unit is N*N, and accordingly the calculation amount and the data amount of the search results in a semantic structure search using a conventional semantic minimum unit is in the order of N*N. When for example N=50, the total number of the combinations is 50*50=2500, while when N=5,000,000, the total number of the combinations is 5,000,000*5,000,000=25,000,000,000,000.

In contrast to this, according to the semantic structure search process illustrated in FIG. 14, the semantic minimum unit of a search target document and the semantic minimum unit of a search request are encoded together, making it enough to just compare the encoded semantic minimum units, and accordingly the calculation amount and the data amount of search results are in the order of N.

Also, in a conventional semantic structure search, vast amount of data that represents correspondence relationships between morpheme analysis results and original sentences and vast amount of data that represents correspondence relationships between semantic structure analysis results and morpheme analysis results are used for performing a search, leading to use of a large capacity of memory.

In contrast to this, the total number of words registered in a word code dictionary used as the semantic symbol information 313 is about several million and the total number of semantic symbols registered in the document semantic structure position information 121 is about several hundred. Accordingly, the amount of data of the document semantic structure position information 121 is reduced by about four digits from the data amount of the semantic symbol information 313, and thereby the reduction by sixteen digits (16=4*4) is expected for combinations of two semantic symbols.

When a search is conducted for text data compressed by using the conventional LZ77 coding, all compressed data is expanded once and thereafter the search is conducted for the expanded data, which leads to reduced processing speeds. In contrast to this, in the semantic structure search process illustrated in FIG. 14, encoded semantic minimum units are compared without expanding the document 311 in a compressed state, which leads to accelerated processing speeds.

Figure 17:
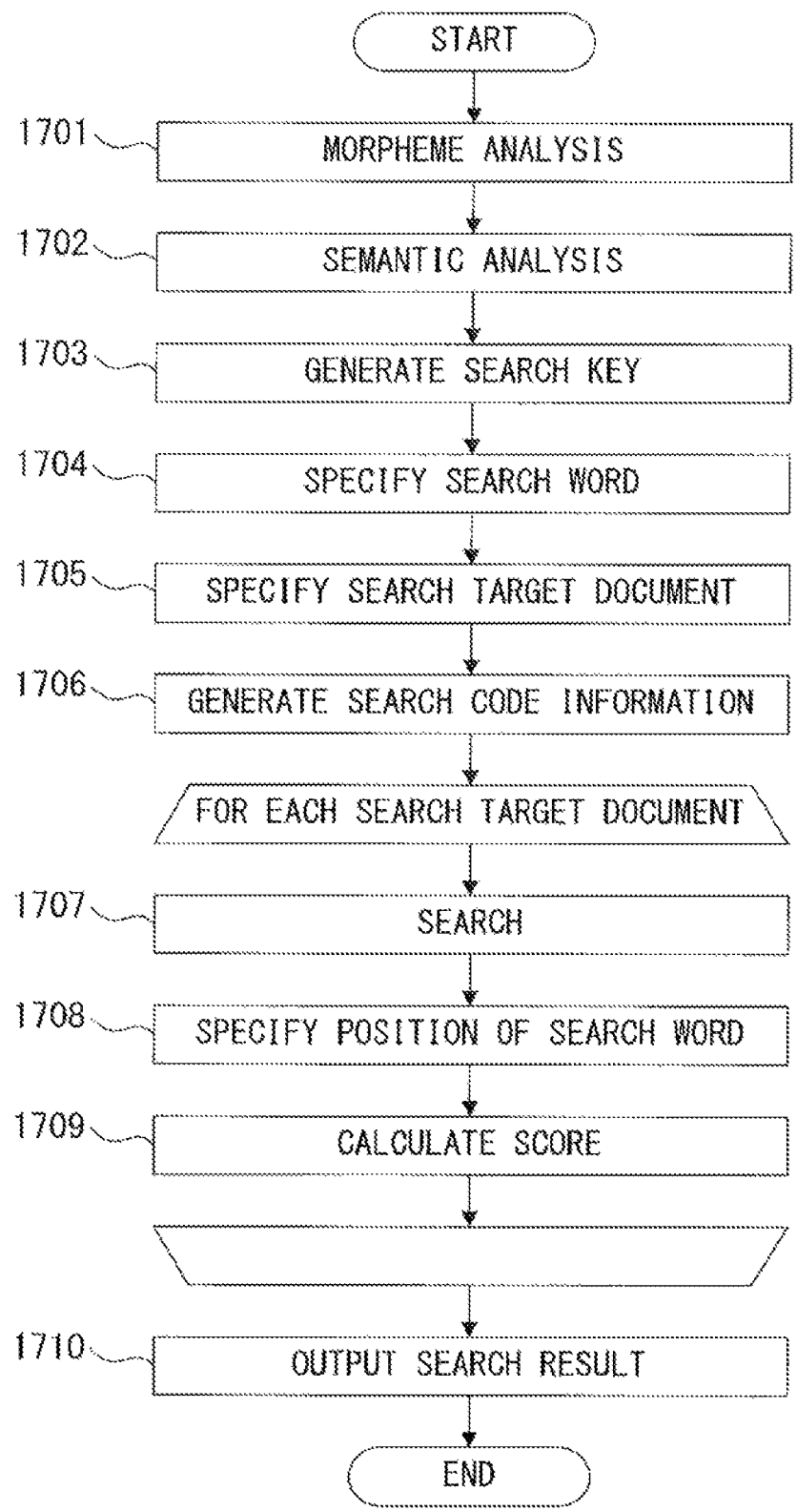
FIG. 17 illustrates a flowchart of a semantic structure search process that conducts score calculation.

FIG. 17 is a flowchart illustrating the semantic structure search process illustrated in FIG. 14 to which a process of calculating the score of a search target document has been added. The processes in step 1701 through 1708 illustrated in FIG. 17 are similar to those in steps 1401 through 1408 illustrated in FIG. 14.

In step 1709, the search unit 112 calculates the score of a search target document by using the score of a search key. Then, in step 1710, the output unit 113 ranks search target documents in accordance with the scores and outputs the search results.

FIG. 18 illustrates a first example of scores of search formulas that are used as scores of search keys. In this example, for each search formula, a score thereof is calculated in advance. For calculations of score S of a search formula, the following equation for example can be used.

$$S = idf1 * N1 + idf2 * N2 \qquad (1)$$

idf1 represents the inverse document frequency of a search word that corresponds to the first dictionary ID included in the search formula, and idf2 represents the inverse document frequency of a search word that corresponds to the second dictionary ID included in the search formula. N1 represents the number of times that the search word corresponding to the first dictionary ID appears in the search request, and N2 represents the number of times that the search word corresponding to the second dictionary ID appears in the search request.

FIG. 19 illustrates a second example of scores of search formulas that are used as scores of search keys. In this example, for calculations of score S of a search formula, the following equation for example is used.

$$S = idf11 * N11 + idf12 * N12 \qquad (2)$$

idf11 represents the inverse document frequency of a semantic symbol that corresponds to the first dictionary ID included in the search formula, and idf12 represents the inverse document frequency of a semantic symbol that corresponds to the second dictionary ID included in the search formula. N11 represents the number of times that the semantic symbol corresponding to the first dictionary ID appears in the search request, and N12 represents the number of times that the semantic symbol corresponding to the second dictionary ID appears in the search request.

All of the search formulas illustrated in FIG. 19 are generated from the same search key (GIVE, HANAKO, OBJECT). Accordingly, when scores S of the search formulas are calculated by using the inverse document frequency of the semantic symbol and the number of times that it appears, the scores S of all the search formulas will have the same value.

Score DS of the search target document is calculated by for example the following equation, which uses score S of a search formula.

$$DS = \Sigma(S * P) \qquad (3)$$

S at the right-hand side in equation (3) represents the score of a search formula identical to the document semantic structure position information 121 in the search target document, P represents the number of times that the search formula is turned to be identical, summation symbol Σ represents the summation of the value of S*P for a plurality of search formulas. By ranking search target documents in the descending order of score DS so as to output the documents, it is possible to present search target documents in the order of importance as search results.

The configuration of the semantic structure search device 101 in FIG. 1 or FIG. 3 is just an example, and the constituents can partially be omitted or changed in accordance with the purposes or conditions of the semantic structure search device 101. For example, when the analysis result 312, the semantic symbol information 313, the mapping information 314 and the bit map information 315 are generated by using an external device, the analysis unit 301, the generation unit 302, the generation unit 303 and the generation unit 304 illustrated in FIG. 3 can be omitted. Also, when the document semantic structure position information 121 is generated by using an external device, the encoding unit 305 illustrated in FIG. 3 can be omitted.

The flowcharts illustrated in FIG. 2, FIG. 4, FIG. 12, FIG. 14 and FIG. 17 are just examples and the processes can partially be omitted or changed in accordance with the configurations or conditions of the semantic structure search device 101. For example, when the analysis result 312, the semantic symbol information 313, the mapping information 314, the bit map information 315 and the document semantic structure position information 121 are generated by using an external device, the compression process illustrated in FIG. 4 can be omitted.

When search target documents are not narrowed in the semantic structure search process illustrated in FIG. 14 or FIG. 17, the processes in step 1405 and step 1705 can be omitted. In the semantic structure search processes illustrated in FIG. 14 and FIG. 17, a search key including three or more semantic symbols can be used instead of a search key including two semantic symbols.

The analysis result 312 illustrated in FIG. 5, the semantic symbol information 313 illustrated in FIG. 6 and FIG. 7, the mapping information 314 illustrated in FIG. 9 and the bit map information 315 illustrated in FIG. 10 are just examples, and information in a different data configuration can be used in accordance with the configuration or conditions of the semantic structure search device 101. Also, the semantic symbols illustrated in FIG. 11 and the document semantic structure position information 121 illustrated in FIG. 13 are just examples, and information in a different data configuration can be used in accordance with the configurations or conditions of the semantic structure search device 101.

For example, when it is not necessary to distinguish a plurality of same word having different meanings, the attribute information and semantic symbols can be omitted in the morpheme analysis result 511 illustrated in FIG. 5 and the bit map information 315 illustrated in FIG. 10. In such a case, the attribute information can be omitted in the semantic symbol information 313 illustrated in FIG. 6 and FIG. 7.

Equations (1) through (3) are just examples, and scores of search target documents may be calculated by using a different equation.

Figure 20:
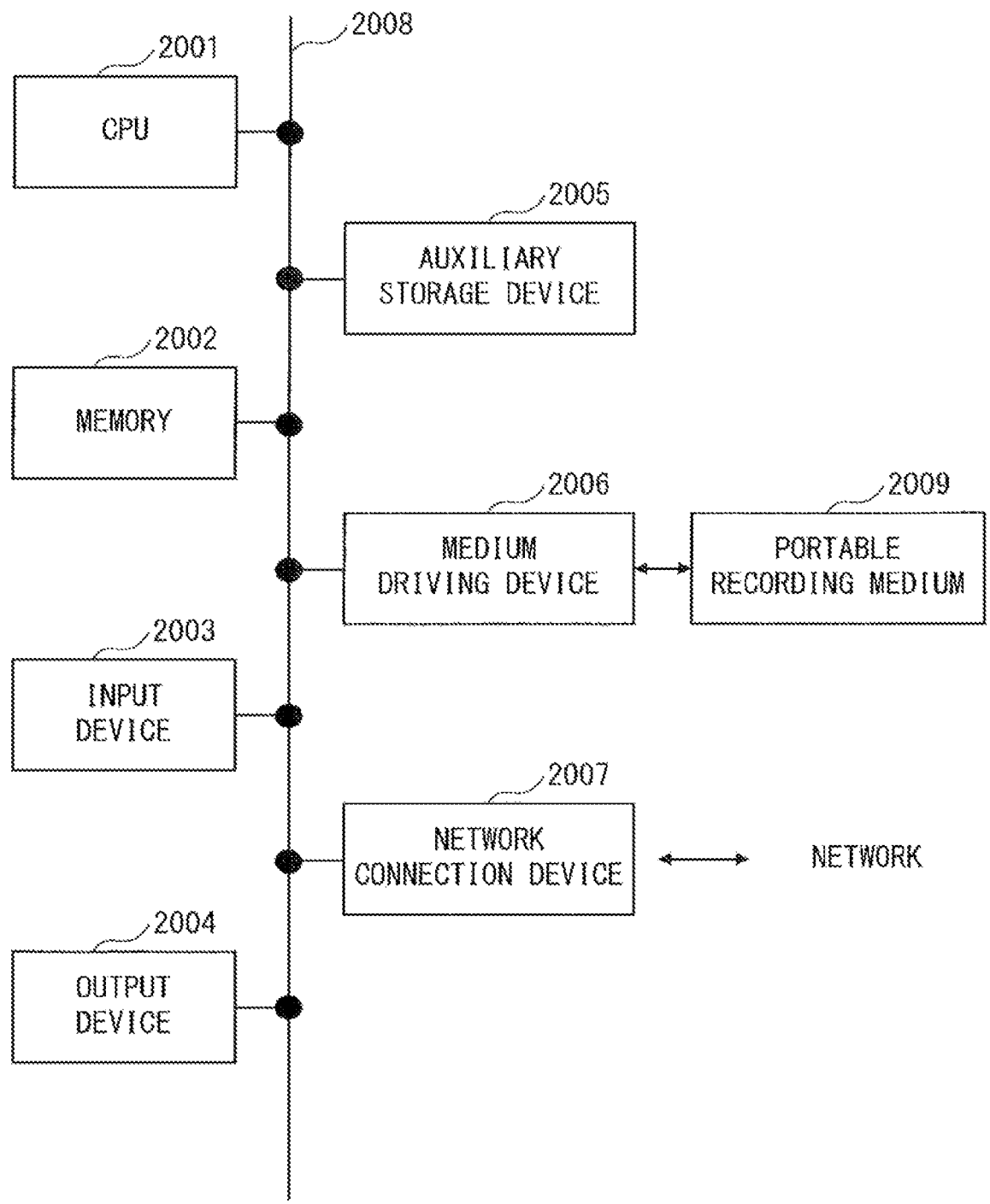
FIG. 20 illustrates a configuration of an information processing apparatus.

The semantic structure search device 101 illustrated in FIG. 1 and FIG. 3 can be implemented by using for example an information processing apparatus (computer) as illustrated in FIG. 20.

The information processing apparatus illustrated in FIG. 20 includes a central processing unit (CPU) 2001, a memory 2002, an input device 2003, an output device 2004, an auxiliary storage device 2005, a medium driving device 2006 and a network connection device 2007. These constituents are connected to each other via a bus 2008.

The memory 2002 is for example a semiconductor memory such as a Read Only Memory (ROM), a Random Access Memory (RAM), a flash memory, etc., and stores a program and data used for the processing. The memory 2002 can be used as the storage unit 111 illustrated in FIG. 1 and FIG. 3.

The CPU 2001 (processor) executes a program by utilizing for example the memory 2002, and thereby operates as the search unit 112, the analysis unit 301, the generation unit 302, the generation unit 303, the generation unit 304 and the encoding unit 305 illustrated in FIG. 1 and FIG. 3.

The input device 2003 is for example a keyboard, a pointing device, etc. and is used for inputting instructions or information from the operator or the user. Instructions from the operator or the user may be a search request of a semantic structure search.

The output device 2004 is for example a display device, a printer, a speaker, etc., and is used for outputting queries or instructions for the operator or the user and for outputting process results. The output device 2004 can be used as the output unit 113 illustrated in FIG. 1 and FIG. 3. Process results can be search results of a semantic structure search.

The auxiliary storage device 2005 is for example a magnetic disk device, an optical disk device, a magneto-optical disk device, a tape device, etc. The auxiliary storage device 2005 may be a hard disk drive or a flash memory. The information processing apparatus can store a program and data in the auxiliary storage device 2005 and load them onto the memory 2002 so as to use them. The auxiliary storage device 2005 can be used as the storage unit 111 illustrated in FIG. 1 and FIG. 3.

The medium driving device 2006 drives a portable recording medium 2009 so as to access information recorded in it. The portable recording medium 2009 is for example a memory device, a flexible disk, an optical disk, a magneto-optical disk, etc. The portable recording medium 2009 may be a Compact Disk Read Only Memory (CD-ROM), a Digital Versatile Disk (DVD), Universal Serial Bus (USB), etc. The operator or the user may store a program or data in the portable recording medium 2009 and load them onto the memory 2002 so as to use them.

As described above, a computer-readable recording medium that stores a program and data used for the processes is a physical (non-transitory) recording medium such as the memory 2002, the auxiliary storage device 2005 and the portable recording medium 2009.

The network connection device 2007 is a communication interface that is connected to a communication network such as a Local Area Network, a Wide Area Network, etc. so as to conduct data conversion accompanying communications. The information processing apparatus can receive a program and data from an external device via the network connection device 2007 and load them onto the memory 2002 to use them.

The information processing apparatus can receive a search request from a user terminal via the network connection device 2007 so as to send a search result to the user terminal. In such a case, the network connection device 2007 can be used as the output unit 113 illustrated in FIG. 1 and FIG. 3.

Note that it is not necessary for the information processing apparatus to include all the constituents illustrated in FIG. 20, and the constituents can partially be omitted in accordance with the purposes or conditions. For example, when the information processing apparatus receives a search request from the user terminal via a communication network, the input device 2003 and the output device 2004 can be omitted. Also, when the portable recording medium 2009 or a communication network is not used, the medium driving device 2006 or the network connection device 2007 can be omitted.

When the information processing apparatus is a mobile terminal having the telephone call function such as a smartphone, it can include a device for telephone calls such as a microphone or a speaker, and can also include an imaging device such as a camera.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a semantic structure search program that causes a computer to execute a process comprising:
generating a plurality of search semantic symbols from a search request by analyzing a first set of words in the search request in natural language processing, the plurality of search semantic symbols representing a semantic structure of the first set of words, wherein the semantic structure is represented by a directed graph having a plurality of nodes and an arc representing a relationship between two nodes and the plurality of nodes represent the plurality of search semantic symbols;
acquiring a compressed document of a search target document generated by analyzing a second set of words in the search target document and encoding the second set of words into codes each of which includes both symbol information indicating a semantic symbol corresponding to a word in the second set of words and positional information indicating a position of the word in the search target document;
specifying a position of a specific word, in the second set of words, that corresponds to the search request by searching the compressed document in accordance with the generated plurality of search semantic symbols; and
outputting a search result including the specific word and the position of the specific word in the search target document.

2. The non-transitory computer-readable recording medium according to claim 1, wherein
the generating the plurality of search semantic symbols is performed in accordance with a first correspondence relationship between each word and each semantic symbol,
the symbol information includes a symbol code corresponding to the semantic symbol corresponding to the word in the second set of words, and
the searching includes generating search symbol codes based on the plurality of search semantic symbols by referring to a second correspondence relationship between each symbol code and each semantic symbol.

3. The non-transitory computer-readable recording medium according to claim 2, wherein
the acquiring the compressed document includes selecting the search target document from a plurality of documents by referring to bit map information indicating whether each word of the second set of words is included in the plurality of documents.

4. The non-transitory computer-readable recording medium according to claim 3, wherein
the first correspondence relationship is a relationship between each word and each pair of a semantic symbol and an attribute,
the bit map information indicates, for each combination of a word, an attribute, and a semantic symbol, whether each word of the second set of words is included in the plurality of documents, and
the selecting is performed based on a specific combination of a word, an attribute, and a semantic symbol corresponding to the first set of words.

5. A semantic structure search device comprising:
a memory configured to store a compressed document of a search target document;
a processor coupled to the memory and configured to generate a plurality of search semantic symbols from a search request by analyzing a first set of words in the search request in natural language processing, the plurality of search semantic symbols representing a semantic structure of the first set of words, and to specify a position of a specific word, in a second set of words in the search target document, that corresponds to the search request by searching the compressed document in accordance with the generated plurality of search semantic symbols, the compressed document being generated by analyzing the second set of words and encoding the second set of words into codes each of which includes both symbol information indicating a semantic symbol corresponding to a word in the second set of words and positional information indicating a position of the word in the search target document, wherein the semantic structure is represented by a directed graph having a plurality of nodes and an arc representing a relationship between two nodes and the plurality of nodes represent the plurality of search semantic symbols; and
an output interface coupled to the processor and configured to output a search result including the specific word and the position of the specific word in the search target document.

6. The semantic structure search device according to claim 5, wherein
the processor generates the plurality of search semantic symbols in accordance with a first correspondence relationship between each word and each semantic symbol,
the symbol information includes a symbol code corresponding to the semantic symbol corresponding to the word in the second set of words, and
the processor generates search symbol codes based on the plurality of search semantic symbols by referring to a second correspondence relationship between each symbol code and each semantic symbol and searches the compressed document.

7. The semantic structure search device according to claim 6, wherein
the processor selects the search target document from a plurality of documents by referring to bit map information indicating whether each word of the second set of words is included in the plurality of documents.

8. The semantic structure search device according to claim 7, wherein
the first correspondence relationship is a relationship between each word and each pair of a semantic symbol and an attribute,
the bit map information indicates, for each combination of a word, an attribute, and a semantic symbol, whether each word of the second set of words is included in the plurality of documents, and
the processor selects the search target document based on a specific combination of a word, an attribute, and a semantic symbol corresponding to the first set of words.

9. A semantic structure search method comprising:
generating, by a processor, a plurality of search semantic symbols from a search request by analyzing a first set of words in the search request in natural language processing, the plurality of search semantic symbols representing a semantic structure of the first set of words, wherein the semantic structure is represented by a directed graph having a plurality of nodes and an arc representing a relationship between two nodes and the plurality of nodes represent the plurality of search semantic symbols;

acquiring, by the processor, a compressed document of a search target document generated by analyzing a second set of words in the search target document and encoding the second set of words into codes each of which includes both symbol information indicating a semantic symbol corresponding to a word in the second set of words and positional information indicating a position of the word in the search target document;

specifying, by the processor, a position of a specific word, in the second set of words, that corresponds to the search request by searching the compressed document in accordance with the generated plurality of search semantic symbols; and outputting a search result including the specific word and the position of the specific word in the search target document.

10. The semantic structure search method according to claim 9, wherein the generating the plurality of search semantic symbols is performed in accordance with a first correspondence relationship between each word and each semantic symbol, the symbol information includes a symbol code corresponding to the semantic symbol corresponding to the word in the second set of words, and the searching includes generating search symbol codes based on the plurality of search semantic symbols by referring to a second correspondence relationship between each symbol code and each semantic symbol.

11. The semantic structure search method according to claim 10, wherein the acquiring the compressed document includes selecting the search target document from a plurality of documents by referring to bit map information indicating whether each word of the second set of words is included in the plurality of documents.

12. The semantic structure search method according to claim 11, wherein the first correspondence relationship is a relationship between each word and each pair of a semantic symbol and an attribute, the bit map information indicates, for each combination of a word, an attribute, and a semantic symbol, whether each word of the second set of words is included in the plurality of documents, and the selecting is performed based on a specific combination of a word, an attribute, and a semantic symbol corresponding to the first set of words.

13. The non-transitory computer-readable recording medium according to claim 1, wherein the positional information indicates a specific number of words corresponding to the semantic symbol from beginning of the search target document.

* * * * *